United States Patent
Ji et al.

(10) Patent No.: US 10,776,008 B2
(45) Date of Patent: Sep. 15, 2020

(54) MEMORY SYSTEM AND OPERATING METHOD THEREOF

(71) Applicant: SK hynix Inc., Gyeonggi-do (KR)

(72) Inventors: Seung Gu Ji, Seoul (KR); Byeong Gyu Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 126 days.

(21) Appl. No.: 16/201,093

(22) Filed: Nov. 27, 2018

(65) Prior Publication Data

US 2019/0339868 A1 Nov. 7, 2019

(30) Foreign Application Priority Data

May 4, 2018 (KR) .......................... 10-2018-0051790

(51) Int. Cl.
 *G06F 3/06* (2006.01)
(52) U.S. Cl.
 CPC .......... *G06F 3/0604* (2013.01); *G06F 3/0655* (2013.01); *G06F 3/0679* (2013.01)
(58) Field of Classification Search
 None
 See application file for complete search history.

(56) References Cited

U.S. PATENT DOCUMENTS

| | | | | |
|---|---|---|---|---|
| 2013/0073795 | A1* | 3/2013 | Hasegawa | G06F 12/0238 711/103 |
| 2017/0070444 | A1* | 3/2017 | Dhanabalan | H04L 47/2441 |
| 2018/0196755 | A1* | 7/2018 | Kusuno | G06F 3/0656 |
| 2018/0341582 | A1* | 11/2018 | Moon | G06F 12/0246 |
| 2019/0220201 | A1* | 7/2019 | Jia | G06F 3/061 |

FOREIGN PATENT DOCUMENTS

KR 101739556 5/2017

* cited by examiner

*Primary Examiner* — William E. Baughman
(74) *Attorney, Agent, or Firm* — IP & T Group LLP

(57) ABSTRACT

A method for operating a memory system includes checking, by a memory device manager, an available capacity of a memory device in response to a write request transmitted from a host device; determining, by the memory device manager, a parallel access size based on the available capacity; comparing, by the memory device manager, a size of host data to be written in one or more nonvolatile memory devices in response to the write request, with the available capacity; receiving, by the memory device manager, host data of a first size in the memory device from the host device; and writing, by an access unit, the host data received in the memory device, to the nonvolatile memory devices by a unit of the parallel access size.

20 Claims, 12 Drawing Sheets

US 10,776,008 B2

MEMORY SYSTEM AND OPERATING METHOD THEREOF

CROSS-REFERENCES TO RELATED APPLICATION

The present application claims priority under 35 U.S.C. 119(a) to Korean application number 10-2018-0051790, filed on May 4, 2018, which is incorporated herein by reference in its entirety.

BACKGROUND

1. Technical Field

Various embodiments generally relate to a memory system and, more particularly, to a memory system including a nonvolatile memory device.

2. Related Art

A memory system may be configured to store data provided from a host device, in response to a write request from the host device. Also, the memory system may be configured to provide stored data to the host device, in response to a read request from the host device. The host device may be any electronic device capable of processing data including, for example, a computer, a digital camera or a mobile phone. A memory system may operate by being built in the host device, or may operate by being manufactured in a separable form and being coupled to the host device.

SUMMARY

Various embodiments of the present disclosure are directed to memory system and operating method thereof capable of efficiently using a memory device and processing a write request of a host device.

An aspect of the present invention is directed to a method for operating a memory system. In an embodiment, a method for operating a memory system may include: checking, by a memory device manager, an available capacity of a memory device in response to a write request transmitted from a host device; determining, by the memory device manager, a parallel access size based on the available capacity; comparing, by the memory device manager, a size of host data to be written in one or more nonvolatile memory devices in response to the write request, with the available capacity; receiving, by the memory device manager, host data of a first size in the memory device from the host device; and writing, by an access unit, the host data received in the memory device, to the nonvolatile memory devices by a unit of the parallel access size.

Another aspect of the present invention is directed to a memory system. In an embodiment, a memory system may include: one or more nonvolatile memory devices; and a controller including a memory device which temporarily stores data transmitted from a host device, wherein the controller comprises: a memory device manager configured to: check an available capacity of the memory device in response to a write request transmitted from the host device; determine a parallel access size based on the available capacity; compare a size of host data to be written in the one or more nonvolatile memory devices in response to the write request with the available capacity; and receive host data having a first size in the memory device from the host device; and an access unit configured to write the host data received in the memory device to the nonvolatile memory devices by a unit of the parallel access size.

Another aspect of the present invention is directed to a memory system. In an embodiment, a memory system may include: one or more nonvolatile memory apparatuses; a memory device; and a controller configured to perform steps of: determining a parallel access size up to a smaller one between a currently available capacity of the memory device and a maximum parallel access size; controlling the memory device to buffer at least a part of write data as much as the available capacity to the maximum; controlling the nonvolatile memory apparatuses to store in parallel the buffered write data in data segments each having a size equal to the determined parallel access size; clearing the buffered write data from the memory device; and repeating the determining and the controlling until the nonvolatile memory apparatuses store the write data.

These and other features and advantages of the present invention will become apparent to the skilled person from the following detailed description of various embodiments of the present invention in conjunction with the accompanying figures.

DETAILED DESCRIPTION

Figure 1:
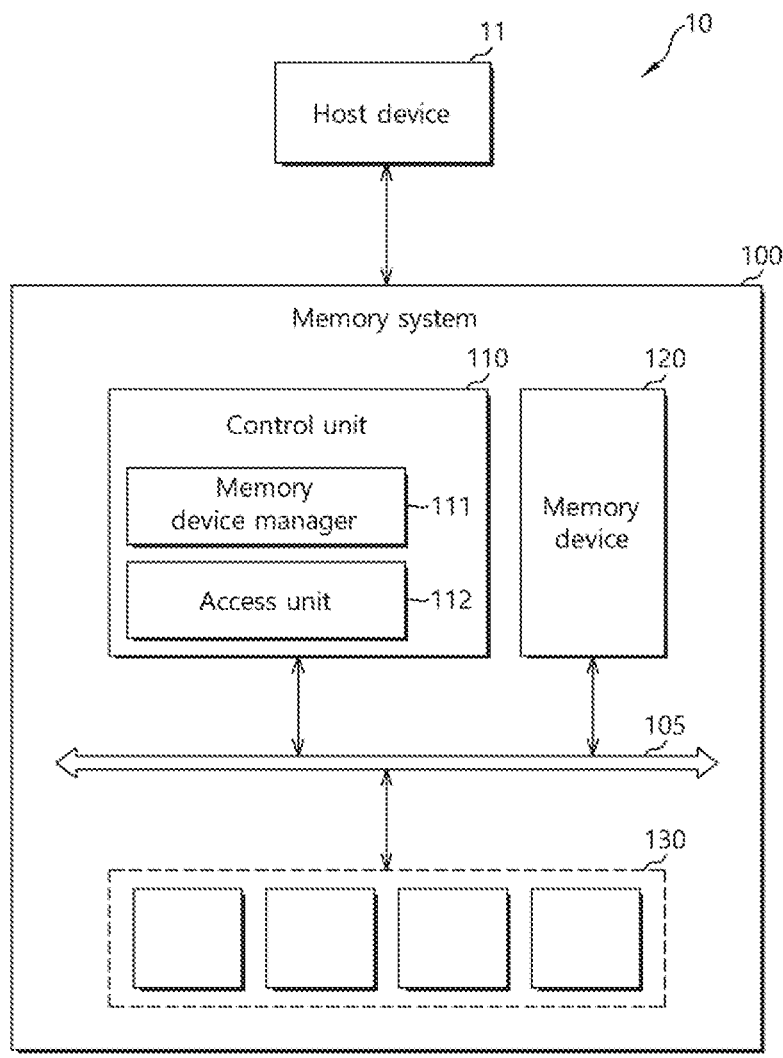
FIG. 1 is a simplified diagram illustrating a data processing system including a memory system in accordance with an embodiment.

In the present disclosure, advantages, features and methods for achieving them will become more apparent after a reading of the following exemplary embodiments taken in conjunction with the accompanying drawings. The present disclosure may, however, be embodied in different forms and should not be construed as being limited to the embodiments set forth herein. Rather, these embodiments are provided to describe the present disclosure in detail to the extent that a person skilled in the art to which the disclosure pertains can easily carry out the technical ideas of the present disclosure.

It is to be understood herein that embodiments of the present disclosure are not limited to the particulars shown in the drawings and that the drawings are not necessarily to scale and, in some instances, proportions may have been exaggerated in order to more clearly depict certain features of the disclosure. While particular terminology is used herein, it is to be appreciated that the terminology used herein is for the purpose of describing particular embodiments only and is not intended to limit the scope of the present disclosure.

As used herein, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

Hereinafter, a memory system and an operating method thereof will be described below with reference to the accompanying drawings through various examples of embodiments.

FIG. 1 is a simplified diagram illustrating a configuration example of a data processing system 10 including a memory system 100 in accordance with an embodiment.

Referring to FIG. 1, the data processing system 10 may be any electronic device capable of processing data including, for example, a personal computer, a laptop computer, a smartphone, a tablet computer, a digital camera, a game console, a navigation, a virtual reality device, a wearable device, etc.

The data processing system 10 may include a host device 11 operably coupled to the memory system 100.

The host device 11 may store host data in the memory system 100 by controlling the memory system 100. The host device 11 may transmit a write request to the memory system 100 to store the host data in the memory system 100. The write request may include an information on the size of the host data to be written in nonvolatile memory devices 130.

The memory system 100 may store the host data under the control of the host device 11.

The memory system 100 may be configured as a Personal Computer Memory Card International Association (PCM-CIA) card, a Compact Flash (CF) card, a smart media card, a memory stick, various multimedia cards (MMC, eMMC, RS-MMC, and MMC-Micro), various secure digital cards (SD, Mini-SD, and Micro-SD), a Universal Flash Storage (UFS), a Solid-state Drive (SSD) and the like.

The memory system 100 may include a control unit 110, a memory device 120 and the nonvolatile memory devices 130 operably connected to each other via a memory system bus 105.

The control unit 110 may control an operation of the memory system 100 under the control of the host device 11. In response to a write request of the host device 11, the control unit 110 may write host data corresponding to the write request, in at least one of the nonvolatile memory devices 130.

The control unit 110 may include a memory device manager 111 and an access unit 112.

The memory device manager 111 may control to memory device 120 to temporarily store the host data before the host data is written in at least one of the nonvolatile memory devices 130. That is to say, the host data may be buffered in the memory device 120 before being written in at least one of the nonvolatile memory devices 130.

The memory device manager 111 may determine a parallel access size for the nonvolatile memory devices 130, based on an available capacity of the memory device 120. The parallel access size may be the size of data to be written in parallel at a time in selected nonvolatile memory devices 130 among the nonvolatile memory devices 130. The parallel access size may be a multiple of the size of data to be written at a time in a single nonvolatile memory device 130. For example, when the size of data to be written at a time in a single nonvolatile memory device 130 is 100 and there are total four nonvolatile memory devices 130, the parallel access size may be 100, 200, 300 or 400. When maximum four nonvolatile memory devices 130 are accessible in parallel, the maximum value of the parallel access size (hereinafter, referred to as a maximum parallel access size) may be the maximum value of the size of data to be written in parallel at a time in the nonvolatile memory devices 130, that is, 400.

When the available capacity of the memory device 120 is equal to or larger than the maximum parallel access size, the memory device manager 111 may determine the maximum parallel access size as the parallel access size. When the available capacity of the memory device 120 is smaller than the maximum parallel access size, the memory device manager 111 may determine the parallel access size to be equal to or smaller than the available capacity of the memory device 120.

The memory device manager 111 may compare the available capacity of the memory device 120 and the size of host data corresponding to a write request, and may receive host data of a determined size in the memory device 120. The step of determining the size of the host data to be provided from the host device 11 will be described later in more detail. The size of host data to be compared with the available capacity of the memory device 120 may be the size of host data to be provided from the host 11 among the host data to be written in the nonvolatile memory devices 130. Thus, before receiving the host data according to a write request, the memory device manager 111 may compare the available capacity of the memory device 120 with the total size of the host data corresponding to the write request.

When the size of host data corresponding to the write request is equal to or smaller than the available capacity of the memory device 120, the memory device manager 111 may transfer the corresponding host data in the memory device 120. In other words, when the available capacity of the memory device 120 is sufficient, the memory device manager 111 may transfer in the memory device 120 all of host data which correspond to the write request.

However, when the size of host data which correspond to the write request exceeds the available capacity of the memory device 120, the memory device manager 111 may transfer in the memory device 120 only host data having a total size equal to the parallel access size. Namely, when the available capacity of the memory device 120 is insufficient, the memory device manager 111 may receive in the memory device 120 the host data by a unit of the parallel access size. In this case, as the access unit 112 writes the host data stored in the memory device 120 to the nonvolatile memory devices 130 as will be described later, the memory device manager 111 may return a memory region currently buffering the host data, which just has been stored into the nonvolatile memory devices 130 among buffered host data in the memory device 120 and then receive in the memory device 120 the remaining host data to be provided from the host device 11. That is to say, the host data may be transmitted to the memory device 120 by a unit of the parallel access size when the available capacity of the memory device 120 is insufficient.

In more detail, after the access unit 112 writes the host data stored in the memory device 120 to the nonvolatile memory devices 130, the memory device manager 111 may return a memory region currently buffering the host data, which just has been stored into the nonvolatile memory devices 130 among buffered host data in the memory device 120 and determine whether there still remains host data to be provided from the host device 11 with respect to the write request. Since the memory device manager 111 is aware of the total size of the host data to be written in the nonvolatile memory devices 130 when receiving the corresponding write request from the host device 11, the memory device manager 111 may determine whether there still remains host data to be provided from the host device 11.

When there remains host data to be provided from the host device 11, the memory device manager 111 may compare the available capacity of the memory device 120 and the size of the remaining host data to be provided from the host device 11, and may receive host data of a determined size in the memory device 120. A method for determining the size of host data to be received in the memory device 120 may be the same as described above.

According to an embodiment, each time the remaining host data is provided into the memory device 120, the memory device manager 111 may check the available capacity of the memory device 120, determine a new parallel access size and receive host data having the new parallel access size into the memory device 120 among the remaining data to be provided from the host device 11. That is, the memory device manager 111 may change the parallel access size according to the available capacity of the memory device 120, which is checked each time the remaining host data is provided into the memory device 120.

In order to receive host data in the memory device 120 from the host device 11, the memory device manager 111 may transmit a ready signal to the host device 11. The ready signal may include an information on the size of host data which the memory device 120 can store. The host device 11 may provide the memory device 120 with host data of the size reported by the memory device manager 111 in response to the ready signal.

The access unit 112 may write host data stored in the memory device 120 to the nonvolatile memory devices 130 by the parallel access size. In detail, the access unit 112 may write host data having a total size that is equal to the parallel access size to one or more nonvolatile memory devices 130 as maybe needed for receiving the data having a size corresponding to the parallel access size among the nonvolatile memory devices 130.

For example, when the host data stored in the memory device 120 is larger than the parallel access size, the access unit 112 may write host data in nonvolatile memory devices 130 by dividing the host data by the parallel access size.

For example, when the host data stored in the memory device 120 matches the parallel access size, the access unit 112 may write the host data having a total size that is equal to the parallel access size in one or more nonvolatile memory devices 130 as maybe needed for receiving the data having a size corresponding to the parallel access size among the nonvolatile memory devices 130.

For example, when the host data stored in the memory device 120 is smaller than the parallel access size, the access unit 112 may merge the host data with another data so that the merged data has the parallel access size. Then, the access unit 112 may write the merged data having a total size that is equal to the parallel access size, in one or more nonvolatile memory devices 130 as maybe needed for receiving the data having a size corresponding to the parallel access size. For example, the other data to be merged with host data may include host data also stored in the memory device 120 in response to a subsequent write request of the host device 11. For another example, the other data to be merged with host data may include dummy data or management data of the control unit 110 which is not related with the write request of the host device 11.

The memory device 120 may perform the function of a working memory device, a buffer memory device or a cache memory device of the control unit 110. The memory device 120 as a working memory device may store software programs and various program data to be driven by the control unit 110. The memory device 120 as a buffer memory device may buffer data transmitted between the host device 11 and the nonvolatile memory devices 130. The memory device 120 as a cache memory device may temporarily store cache data.

As such, when the memory device 120 is used for various uses, the available capacity of the memory device 120 may be insufficient to receive all the host data corresponding to the write request. Therefore, the memory device manager 111 may adjust the parallel access size depending on the available capacity of the memory device 120, and may receive host data in the memory device 120 by the parallel access size. The access unit 112 may then select and access in parallel one or more nonvolatile memory devices 130 having a total data size corresponding to the parallel access size and thereby write the host data in the selected nonvolatile memory devices 130. In this way, the memory system 100 may more efficiently use the memory device 120, and more quickly process the write request of the host device 11.

Each of the nonvolatile memory devices 130 may store host data transmitted from the memory device 120 under the control of the access unit 112.

Each nonvolatile memory device may be a flash memory, such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

While it is illustrated in FIG. 1 that the memory system 100 includes four nonvolatile memory devices 130, it is to be noted that the number of nonvolatile memory devices included in the memory system 100 is not limited thereto.

Figure 2:
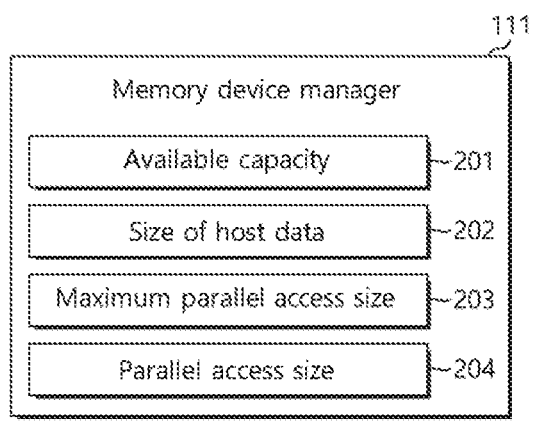
FIG. 2 is a simplified diagram illustrating an example of information managed by the memory device manager of FIG. 1 in accordance with the embodiment.

FIG. 2 is a simplified diagram illustrating a configuration example of plural pieces of information managed by the memory device manager 111 of FIG. 1 in accordance with the embodiment.

Referring to FIG. 2, the memory device manager 111 may include memories 201 to 204.

The memory device manager 111 may check the available capacity of the memory device 120 and memorize it in the memory 201. For example, in an embodiment, the memory device manager 111 may check the available capacity of the memory device 120 when receiving a write request from the host device 11. For example, in another embodiment, the memory device manager 111 may check the available capacity of the memory device 120 at predetermined intervals, e.g. periodically at a predetermined time period. The memory device manager 111 may check the available capacity of the memory device 120 to determine the parallel access size.

The memory device manager 111 may memorize in the memory 202 the size of remaining host data to be from the host device 11 in relation with a write request. For example, the memory device manager 111 may memorize in the memory 202 the total size of the host data to be written in the nonvolatile memory devices 130 as maybe needed for receiving the data having a size corresponding to a write request when receiving the write request. Also, each time when receiving a predetermined size of host data into the memory device 120 from the host device 11, the memory device manager 111 may calculate the size of remaining host data to be provided from the host device 11 and update it in the memory 202.

The memory device manager 111 may determine the maximum parallel access size depending on the number of the nonvolatile memory devices 130 and the size of data that can be written at once in a single nonvolatile memory device 130, and may memorize the maximum parallel access size in the memory 203.

The memory device manager 111 may determine the parallel access size depending on the available capacity of the memory device 120 and memorize it in the memory 204.

FIGS. 3 to 7 are simplified schematics illustrating a method for operating the control unit 110 of FIG. 1 in accordance with an embodiment of the present invention. In FIGS. 3 to 7, a partial memory region of the memory device 120 may be occupied in buffering data, and a partial memory region may be available. The available capacity of the memory device 120 may be determined based on the available memory region of the memory device 120. In FIGS. 3 to 7, the maximum parallel access size will be assumed to be 400 which is based on the number of non-volatile memory devices and the maximum data size that can be stored in each non-volatile memory device.

Figure 3:
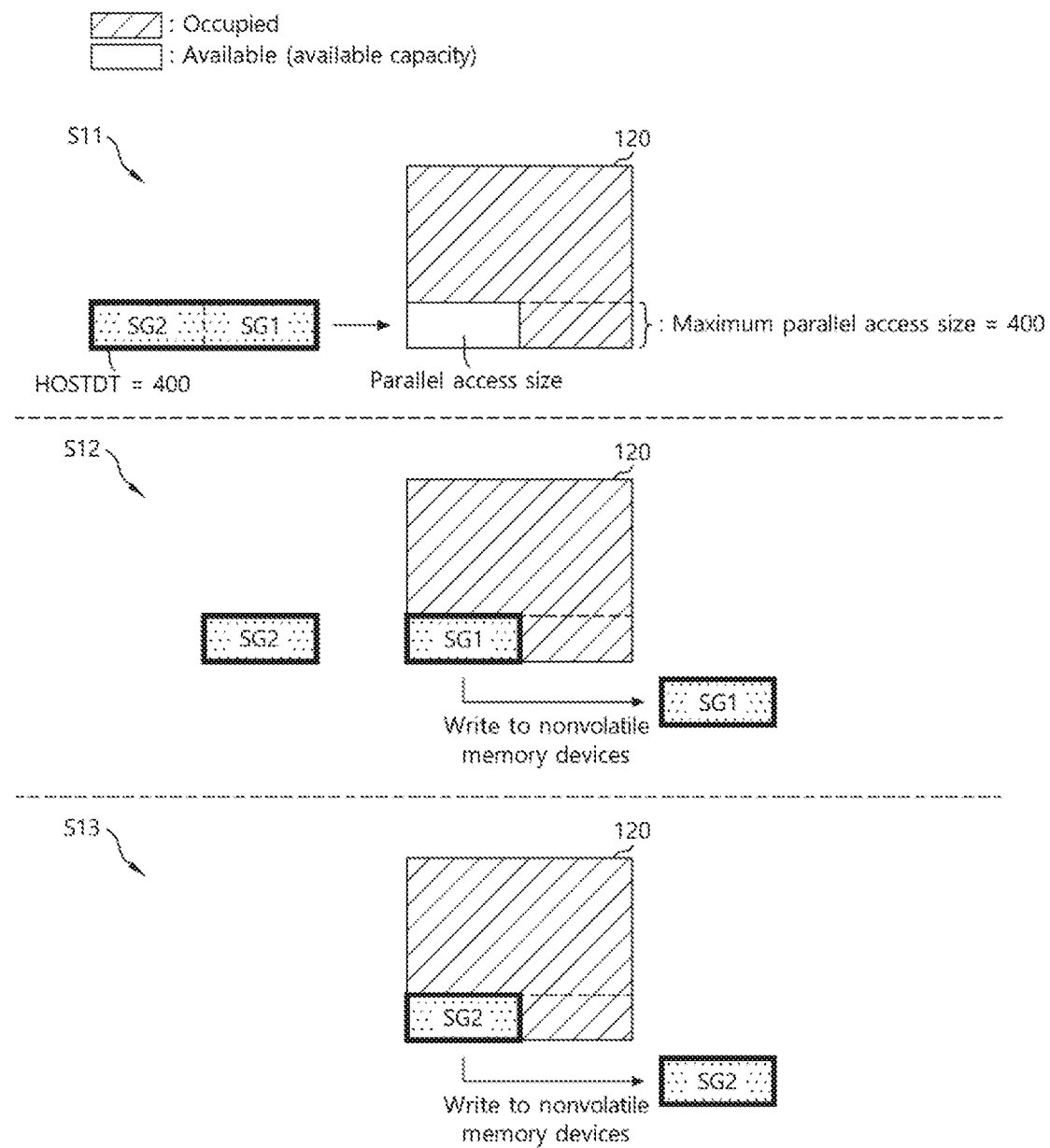
FIGS. 3 to 7 are simplified schematic diagrams illustrating a method for operating a control unit in accordance with the embodiment.

Referring to FIG. 3, at step S11, the memory device manager 111 may transfer a write request for host data HOSTDT of a total size 400 from the host device 11.

The available capacity of the memory device 120 may be smaller than the maximum parallel access size. When the available capacity of the memory device 120 is smaller than the maximum parallel access size, the memory device manager 111 may determine a parallel access size to be equal to or smaller than the available capacity of the memory device 120. For example, when the available capacity of the memory device 120 is 250, the memory device manager 111 may determine a parallel access size as 250 or less. In FIG. 3, the memory device manager 111 may determine the parallel access size as, for example, the available capacity of the memory device 120.

The total size 400 of the host data HOSTDT may exceed the available capacity of the memory device 120. Thus, the host device 11 may divide the host data HOSTDT according to the amount of the determined parallel access size and transmit the divided host data HOSTDT to the memory device 120. The host data HOSTDT divided according to the amount of the determined parallel access size is referred to as host data segments SG1 and SG2. The memory device manager 111 may transmit to the host device 11 a ready signal including an information on the determined parallel access size.

At step S12, the memory device manager 111 may transfer the host data segment SG1 of the parallel access size in the memory device 120 from the host device 11. The access unit 112 may write the host data segment SG1 of the parallel access size in one or more nonvolatile memory devices 130 as maybe needed for receiving the data having a size corresponding to the parallel access size. Since the parallel access size is smaller than the maximum parallel access size, the one or more nonvolatile memory devices 130 as maybe needed for receiving the data having a size corresponding to the parallel access size may be a part of the entire nonvolatile memory devices 130.

After the write operation is performed, the memory region occupied buffering the target host data of the write operation may become available.

At step S13, the memory device manager 111 may transfer the subsequent or remaining host data segment SG2 of the parallel access size in the memory device 120 from the host device 11. The access unit 112 may write the host data segment SG2 of the parallel access size in one or more nonvolatile memory devices 130 as maybe needed for receiving the data having a size corresponding to the parallel access size.

According to an embodiment, the parallel access size may be newly determined depending on the available capacity of the memory device 120 when receiving the host data segment SG2. For example, if some other operation of the memory system 100 is ended while performing the write operation, the available capacity of the memory device 120 may increase. Therefore, the memory device manager 111 may increase the parallel access size according to the increased available capacity.

Figure 4:
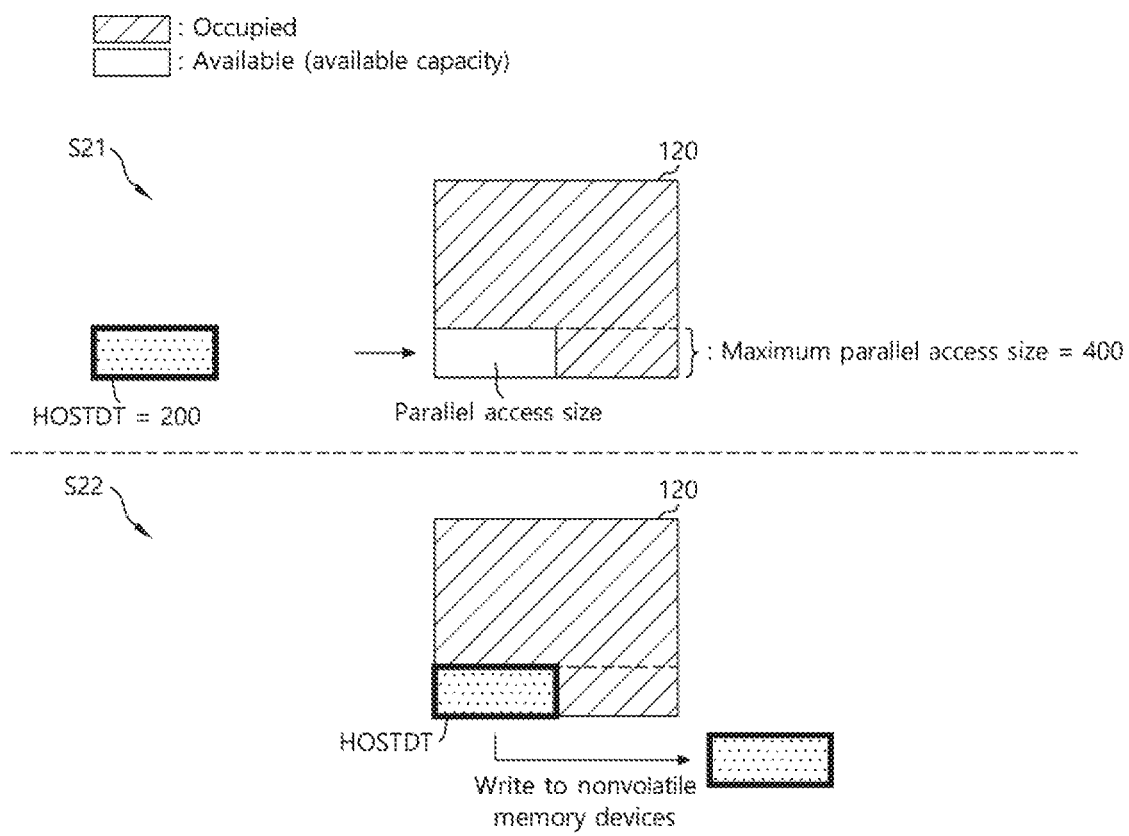

Referring to FIG. 4, at step S21, the memory device manager 111 may transfer a write request for host data HOSTDT of a total size 200 from the host device 11.

The available capacity of the memory device 120 may be smaller than the maximum parallel access size. Therefore, the memory device manager 111 may determine a parallel access size to be the same as the available capacity of the memory device 120, for example.

The total size 200 of the host data HOSTDT may be the same as the available capacity of the memory device 120. Thus, the host device 11 may transmit the host data HOSTDT to the memory device 120. More specifically, the memory device manager 111 may transmit to the host device 11 a ready signal including an information that the memory device 120 can store the entire host data HOSTDT.

At step S22, the memory device manager 111 may transfer the entire host data HOSTDT in the memory device 120 from the host device 11. The access unit 112 may write the host data HOSTDT of the parallel access size in one or more nonvolatile memory devices 130 as maybe needed for receiving the data having a size corresponding to the parallel access size. Since the parallel access size is smaller than the maximum parallel access size, the one or more nonvolatile memory devices 130 as maybe needed for receiving the data having a size corresponding to the parallel access size may be a part of the entire nonvolatile memory devices 130.

Figure 5:
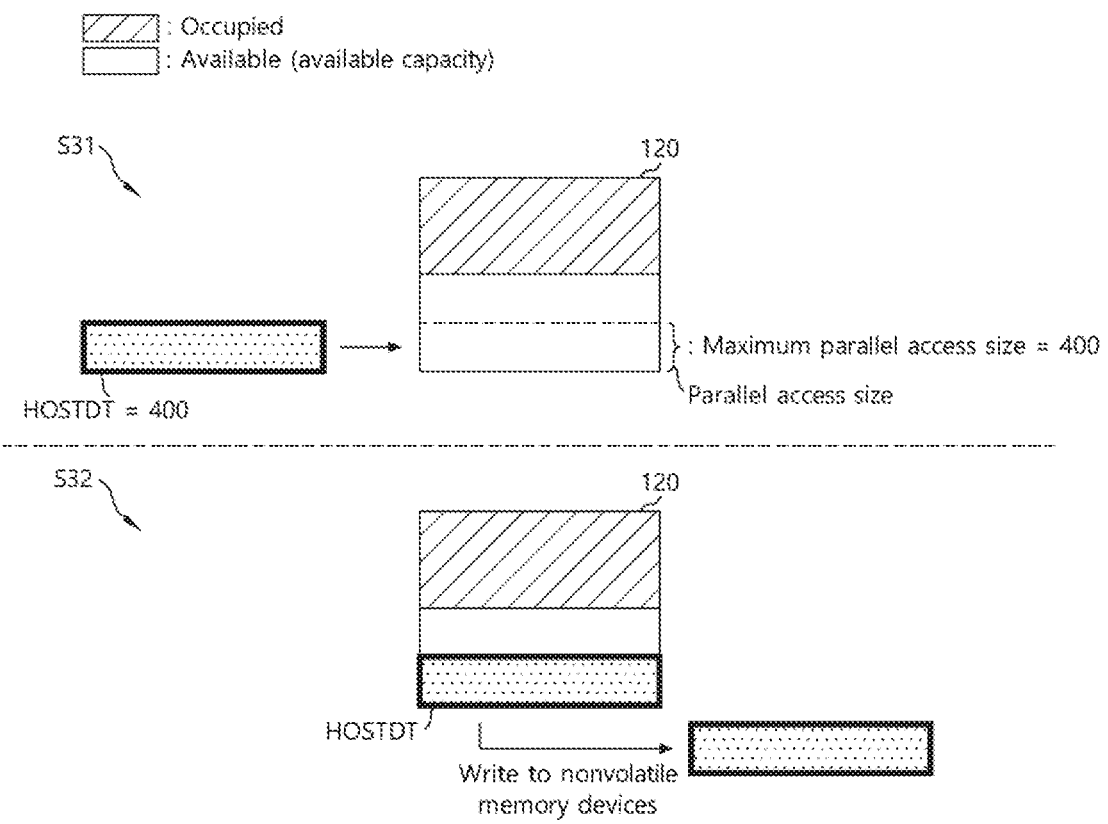

Referring to FIG. 5, at step S31, the memory device manager 111 may transfer a write request for host data HOSTDT of a total size 400 from the host device 11.

The available capacity of the memory device 120 may be equal to or larger than the maximum parallel access size. When the available capacity of the memory device 120 is equal to or larger than the maximum parallel access size, the memory device manager 111 may determine the maximum parallel access size as the parallel access size to operate with maximum performance.

The total size 400 of the host data HOSTDT may be the same as the maximum parallel access size, and thus may be smaller than the available capacity of the memory device 120. Thus, the host device 11 may transmit the entire host data HOSTDT to the memory device 120. To this end, the memory device manager 111 may transmit to the host device 11 a ready signal including an information that the memory device 120 can store the entire host data HOSTDT.

At step S32, the memory device manager 111 may transfer the entire host data HOSTDT in the memory device 120 from the host device 11. The access unit 112 may write the host data HOSTDT in one or more nonvolatile memory devices 130 as maybe needed for receiving the data having a size corresponding to the parallel access size, that is, the entire nonvolatile memory devices 130 in this case.

Figure 6:
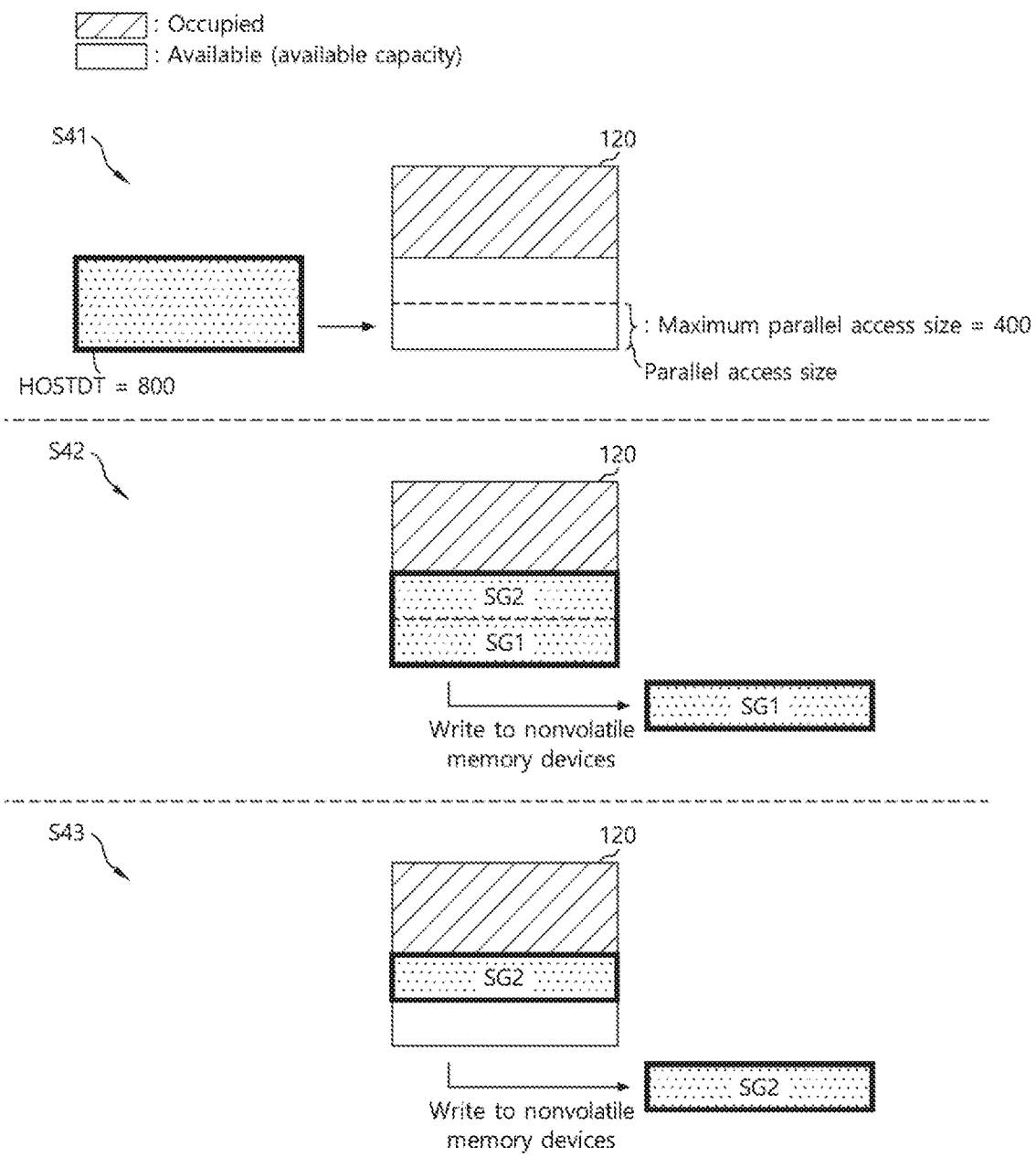

Referring to FIG. 6, at step S41, the memory device manager 111 may transfer a write request for host data HOSTDT of a total size 800 from the host device 11.

The available capacity of the memory device 120 may be equal to or larger than the maximum parallel access size. When the available capacity of the memory device 120 is equal to or larger than the maximum parallel access size, the memory device manager 111 may determine the maximum parallel access size as the parallel access size to operate with maximum performance.

The total size 800 of the host data HOSTDT may be the same as the available capacity of the memory device 120. Thus, the host device 11 may transmit the entire host data HOSTDT to the memory device 120. To this end, the memory device manager 111 may transmit to the host device 11 a ready signal including an information that the memory device 120 can store the entire host data HOSTDT.

At step S42, the memory device manager 111 may transfer the entire host data HOSTDT in the memory device 120 from the host device 11. The access unit 112 may write a host data segment SG1 in one or more nonvolatile memory devices 130 as maybe needed for receiving the data having a size corresponding to the parallel access size, that is, the entire nonvolatile memory devices 130 in this case. After the write operation is performed, the memory region occupied buffering the target host data of the write operation may become available.

At step S43, the access unit 112 may similarly write a host data segment SG2 in the entire nonvolatile memory devices 130.

Figure 7:
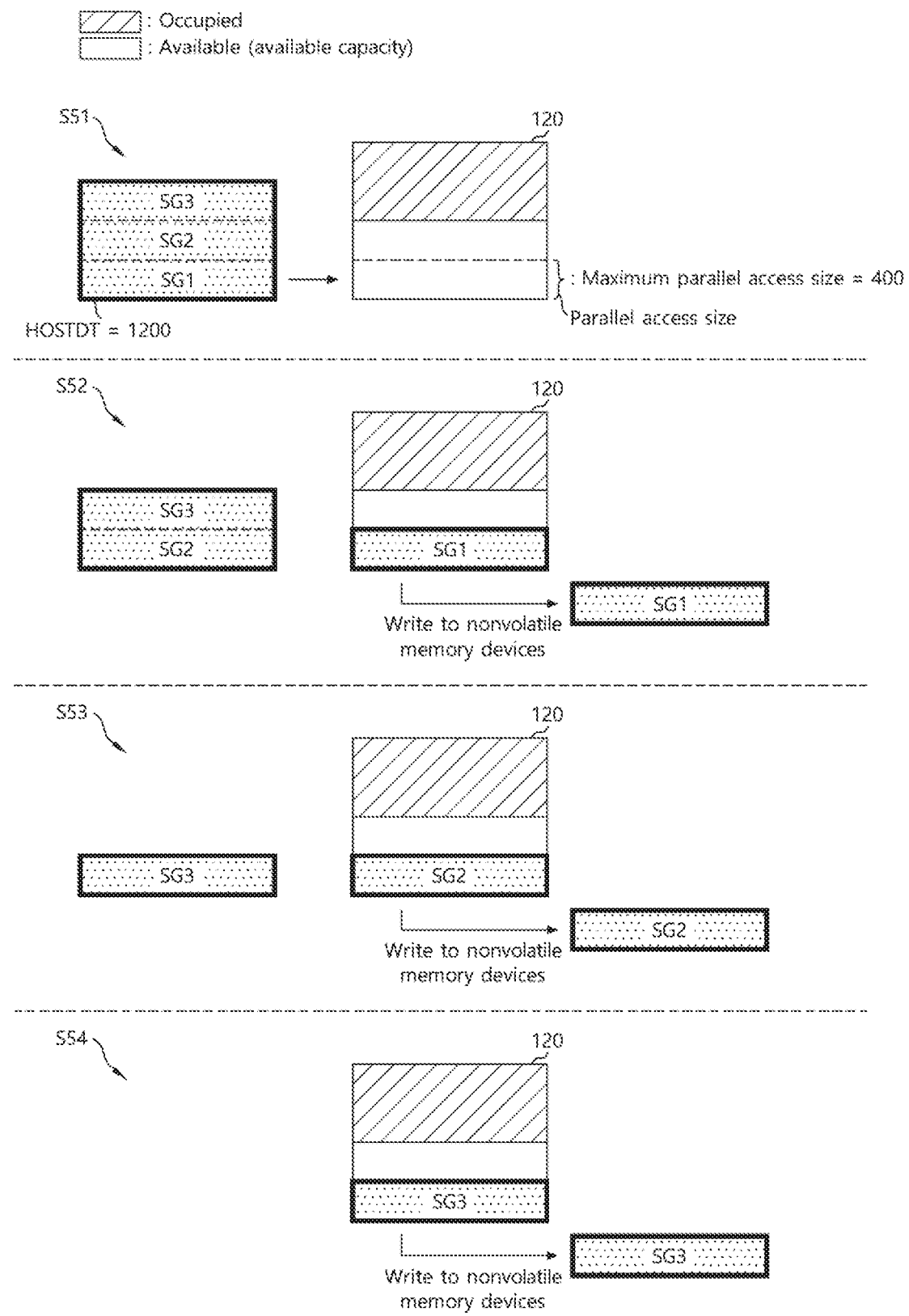

Referring to FIG. 7, at step S51, the memory device manager 111 may transfer a write request for host data HOSTDT of a total size 1200 from the host device 11.

The available capacity of the memory device 120 may be equal to or larger than the maximum parallel access size. When the available capacity of the memory device 120 is equal to or larger than the maximum parallel access size, the memory device manager 111 may determine the maximum parallel access size as the parallel access size to operate with maximum performance.

The total size 1200 of the host data HOSTDT may exceed the available capacity of the memory device 120. Thus, the host device 11 may divide the host data HOSTDT according to the amount of the determined parallel access size and transmit the data segments (i.e., the divided host data HOSTDT) to the memory device 120. The host data HOSTDT according to the amount of the parallel access size may be divided into host data segments SG1 to SG3. The memory device manager 111 may transmit to the host device 11 a ready signal including an information on the parallel access size.

At step S52, the memory device manager 111 may transfer the host data segment SG1 of the parallel access size in the memory device 120 from the host device 11. The access unit 112 may write the host data segment SG1 in one or more nonvolatile memory devices 130 as maybe needed for receiving the data having a size corresponding to the parallel access size, that is, the entire nonvolatile memory devices 130 in this case. After the write operation is performed, the memory region occupied buffering the target host data of the write operation may become available.

Since methods for performing write operations for the host data segments SG2 and SG3 at steps S53 and S54 are the same as the method of the step S52, detailed descriptions thereof will be omitted herein.

Figure 8:
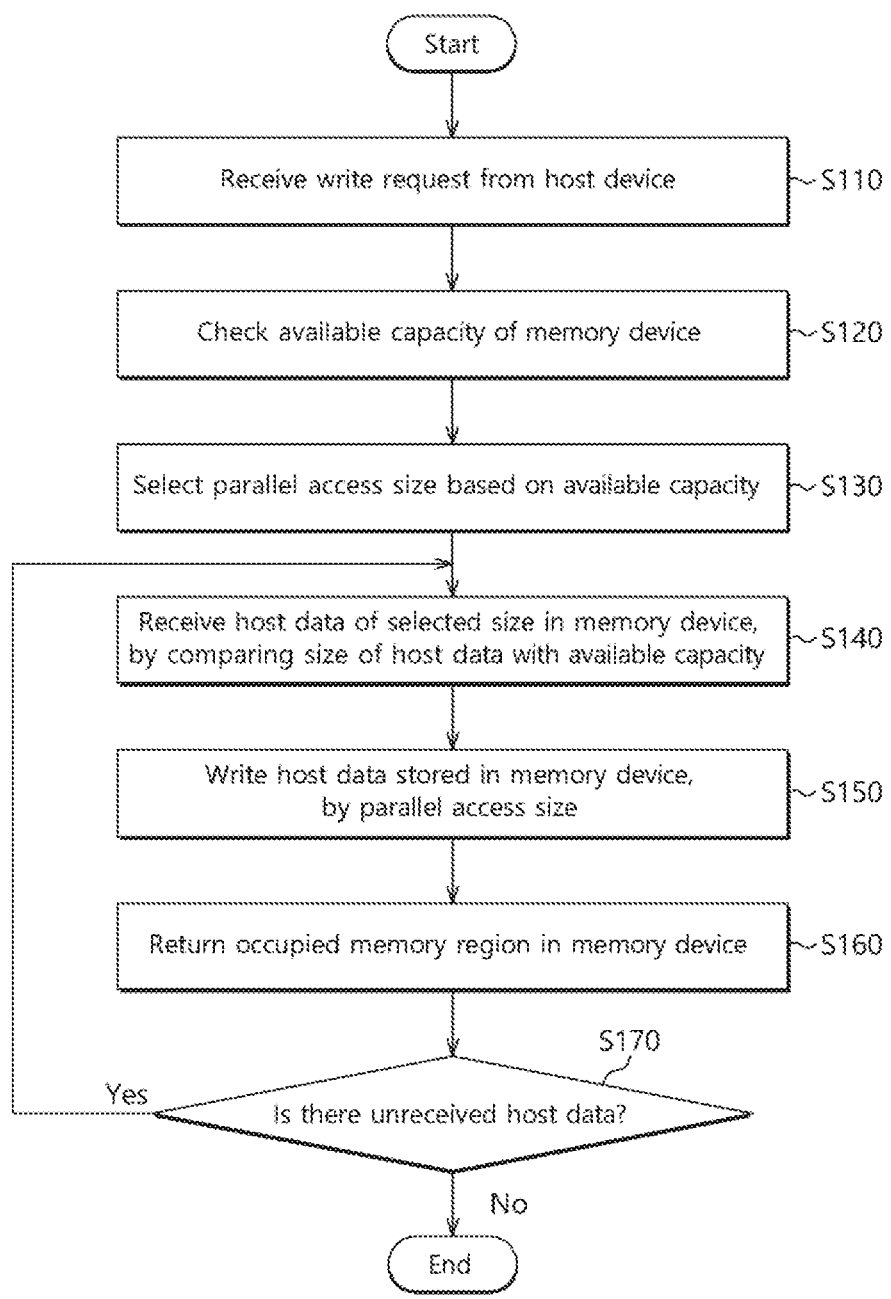
FIG. 8 is a simplified exemplary flow chart for operating a memory system in accordance with an embodiment.

FIG. 8 is a simplified exemplary flow chart for operating the memory system 100 in accordance with an embodiment of the present invention.

Referring to FIG. 8, at step S110, the memory device manager 111 may transfer a write request from the host device 11. The write request may include an information on the total size of host data to be written in the nonvolatile memory devices 130.

At step S120, the memory device manager 111 may check the available capacity of the memory device 120. In the case where the available capacity of the memory device 120 is 0, the memory device manager 111 may continue to check whether the memory device 120 has the available capacity.

At step S130, the memory device manager 111 may determine the parallel access size based on the available capacity of the memory device 120. For example, when the available capacity of the memory device 120 is equal to or larger than the maximum parallel access size, the memory device manager 111 may determine the maximum parallel access size as the parallel access size. When the available capacity of the memory device 120 is smaller than the maximum parallel access size, the memory device manager 111 may determine the parallel access size to be equal to or smaller than the available capacity of the memory device 120.

At step S140, the memory device manager 111 may compare the size of host data corresponding to the write request with the available capacity of the memory device 120, and may receive host data of the determined size in the memory device 120. The size of host data to be compared with the available capacity of the memory device 120 may be the size of host data to be provided from the host 11 among the host data to be written in the nonvolatile memory devices 130 in response to the write request.

In detail, when the size of host data to be provided from the host 11 is equal to or smaller than the available capacity of the memory device 120, the memory device manager 111 may transfer the corresponding host data in the memory device 120. When the size of the host data to be provided from the host 11 exceeds the available capacity of the memory device 120, the memory device manager 111 may transfer only host data having a total size equal to the parallel access size in the memory device 120.

At step S150, the access unit 112 may write the host data stored in the memory device 120 to nonvolatile memory devices 130 according to the amount of the parallel access size. In detail, the access unit 112 may write host data having a total size that is equal to the parallel access size to one or more nonvolatile memory devices 130 as maybe needed for receiving the data having a size corresponding to the parallel access size among the nonvolatile memory devices 130.

For example, when the host data stored in the memory device 120 is larger than the parallel access size, the access unit 112 may divide the host data according to the amount of the determined parallel access size and write the divided host data having a total size that is equal to the parallel access size in one or more nonvolatile memory devices 130 as maybe needed for receiving the data having a size corresponding to the parallel access size among the nonvolatile memory devices 130.

For example, when the host data stored in the memory device 120 matches the parallel access size, the access unit 112 may write the host data having a total size that is equal to the parallel access size in one or more nonvolatile memory devices 130 as maybe needed for receiving the data having a size corresponding to the parallel access size among the nonvolatile memory devices 130.

For example, when the host data stored in the memory device 120 is smaller than the parallel access size, the access unit 112 may merge the host data with another data so that the merged data has the parallel access size. The access unit 112 may then write the merged data having a size equal to the parallel access size to one or more nonvolatile memory devices 130 as maybe needed for receiving the data having a size equal to the parallel access size among the nonvolatile memory devices 130.

At step S160, the memory device manager 111 may return the occupied memory region buffering the target host data in the memory device 120 and thus the occupied memory region may become available.

At step S170, the memory device manager 111 may determine whether there remains host data to be provided from the host device 11 corresponding to the write request. When there is no remaining data in the host device 11 which correspond to the write request, the process may be ended. When there is remaining data in the host, the process may proceed to the step S140. Namely, at the step S140, the memory device manager 111 may compare the size of the remaining host data to be provided from the host device 11 with the available capacity of the memory device 120, and may receive host data of a determined size in the memory device 120. Then, the access unit 112 may write the host data to the nonvolatile memory devices 130 similarly to the above-described method.

Figure 9:
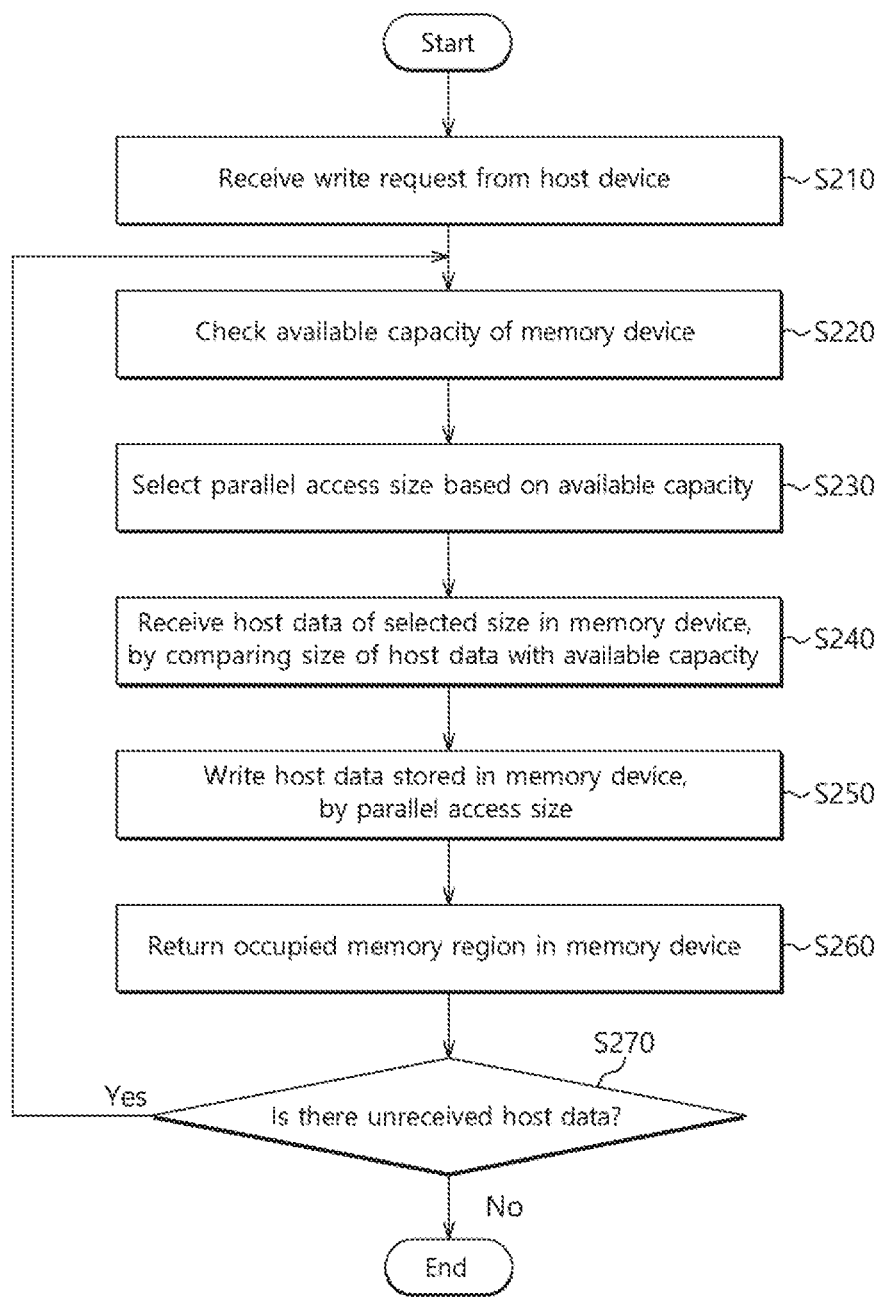
FIG. 9 is a simplified exemplary flow chart for operating a memory system in accordance with an embodiment.

FIG. 9 is a simplified exemplary flow chart for operating the memory system 100 in accordance with an embodiment.

Referring to FIG. 9, steps S210 to S270 may be substantially the same as the steps S110 to S170 shown in FIG. 8. However, when host data to be provided from the host device 11 remains at the step S270, the process may proceed to the step S220. That is to say, at the step S220, the memory device manager 111 may check the available capacity of the memory device 120, and at the step S230, the memory device manager 111 may determine a new parallel access size based on the current available capacity of the memory device 120.

Figure 10:
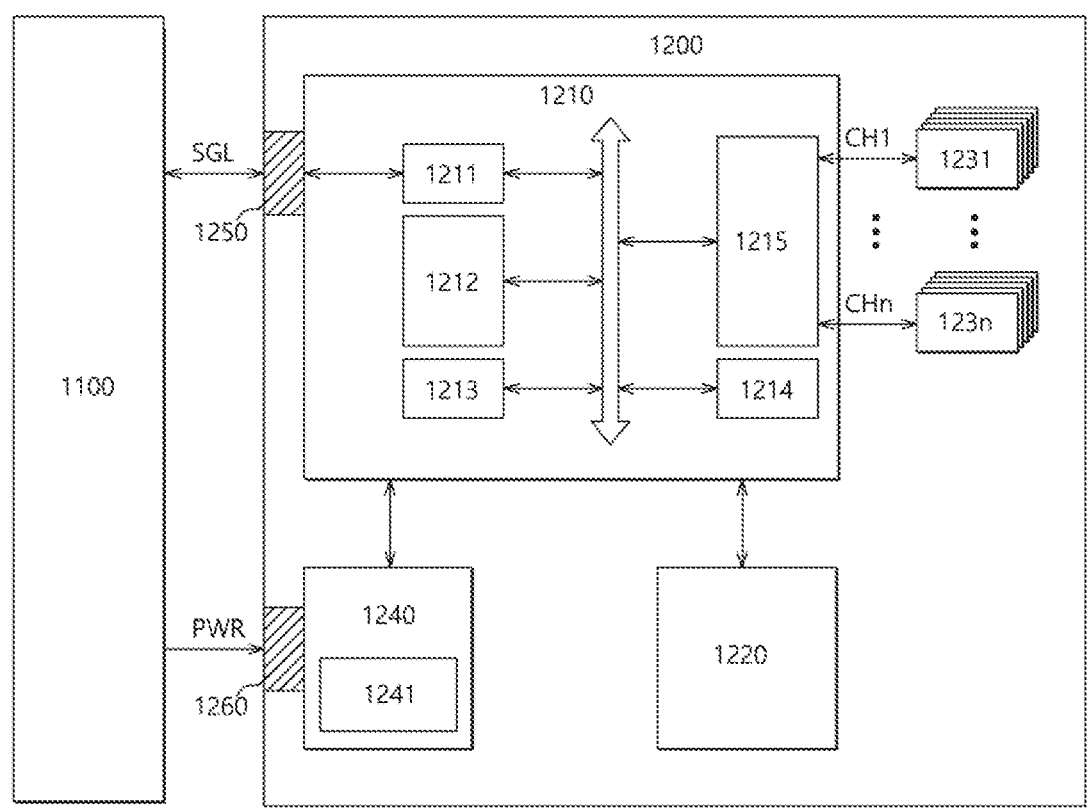
FIG. 10 is a simplified diagram illustrating a data processing system including a solid-state drive (SSD) in accordance with an embodiment.

FIG. 10 is a simplified diagram illustrating a data processing system 1000 including a solid-state drive (SSD) 1200 in accordance with an embodiment. Referring to FIG. 10, the data processing system 1000 may include a host device 1100 and the SSD 1200.

The SSD 1200 may include a controller 1210, a buffer memory device 1220, a plurality of nonvolatile memory devices 1231 to 123n, a power supply 1240, a signal connector 1250, and a power connector 1260.

The controller 1210 may control an operation of the SSD 1200. The controller 1210 may include a host interface unit 1211, a control unit 1212, a random access memory 1213, an error correction code (ECC) unit 1214, and a memory interface unit 1215.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-E) and universal flash storage (UFS).

The control unit 1212 may analyze and process the signal SGL received from the host device 1100. The control unit 1212 may control operations of internal function blocks according to a firmware or a software for driving the SSD 1200. The random access memory 1213 may be used as a working memory for driving such a firmware or software. The control unit 1212 may include the control unit 110 shown in FIG. 1.

The ECC unit 1214 may generate the parity data of data to be transmitted to at least one of the nonvolatile memory devices 1231 to 123n. The generated parity data may be stored together with the data in the nonvolatile memory devices 1231 to 123n. The ECC unit 1214 may detect an error of the data read from at least one of the nonvolatile memory devices 1231 to 123n, based on the parity data. If a detected error is within a correctable range, the ECC unit 1214 may correct the detected error.

The memory interface unit 1215 may provide control signals such as commands and addresses to at least one of the nonvolatile memory devices 1231 to 123n, according to control of the control unit 1212. Moreover, the memory interface unit 1215 may exchange data with at least one of the nonvolatile memory devices 1231 to 123n, according to control of the control unit 1212. For example, the memory interface unit 1215 may provide the data stored in the buffer memory device 1220, to at least one of the nonvolatile memory devices 1231 to 123n, or provide the data read from at least one of the nonvolatile memory devices 1231 to 123n, to the buffer memory device 1220.

The buffer memory device 1220 may temporarily store data to be stored in at least one of the nonvolatile memory devices 1231 to 123n. Further, the buffer memory device 1220 may temporarily store the data read from at least one of the nonvolatile memory devices 1231 to 123n. The data temporarily stored in the buffer memory device 1220 may be transmitted to the host device 1100 or at least one of the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 11:
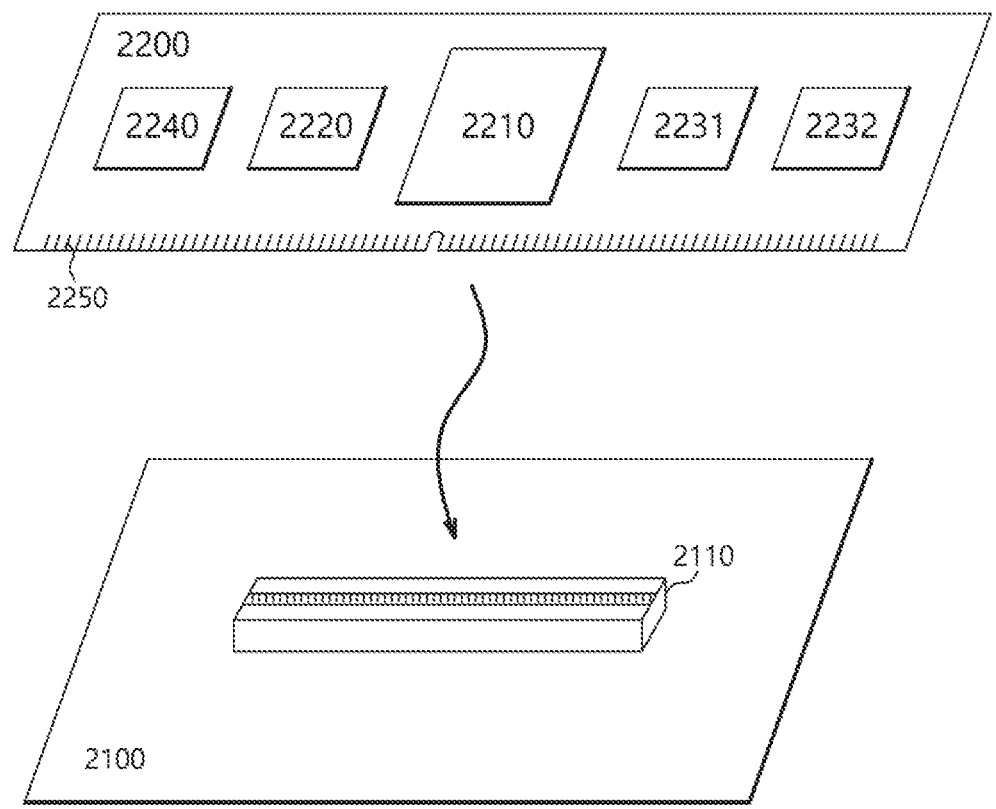
FIG. 11 is a simplified diagram illustrating a data processing system including a memory system in accordance with an embodiment.

FIG. 11 is a simplified diagram illustrating a data processing system 2000 including a memory system 2200 in accordance with an embodiment. Referring to FIG. 11, the data processing system 2000 may include a host device 2100 and the memory system 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot or a connector. The memory system 2200 may be mounted to the connection terminal 2110.

The memory system 2200 may be configured in the form of a board such as a printed circuit board. The memory system 2200 may be referred to as a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control an operation of the memory system 2200. The controller 2210 may be configured in the same manner as the controller 1210 shown in FIG. 10.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the memory system 2200.

The PMIC 2240 may provide the power inputted through the connection terminal 2250, to the inside of the memory system 2200. The PMIC 2240 may manage the power of the memory system 2200 according to control of the controller 2210.

The connection terminal 2250 may be coupled to the connection terminal 2110 of the host device 2100. Through the connection terminal 2250, signals such as commands, addresses, data and so forth and power may be transferred between the host device 2100 and the memory system 2200. The connection terminal 2250 may be configured into various types depending on an interface scheme between the host device 2100 and the memory system 2200. The connection terminal 2250 may be disposed on any one side of the memory system 2200.

Figure 12:
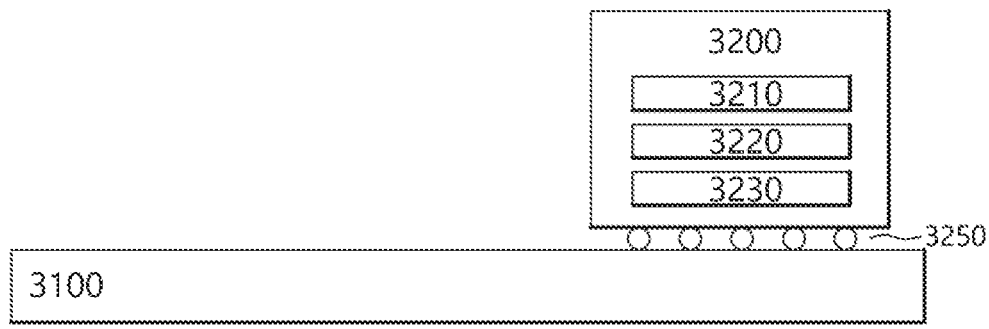
FIG. 12 is a simplified diagram illustrating a data processing system including a memory system in accordance with an embodiment.

FIG. 12 is a simplified diagram illustrating a data processing system 3000 including a memory system 3200 in accordance with an embodiment. Referring to FIG. 12, the data processing system 3000 may include a host device 3100 and the memory system 3200.

The host device 3100 may be configured in the form of a board such as a printed circuit board. Although not shown, the host device 3100 may include internal function blocks for performing the function of a host device.

The memory system 3200 may be configured in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control an operation of the memory system 3200. The controller 3210 may be configured in the same manner as the controller 1210 shown in FIG. 10.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the memory system 3200.

Figure 13:
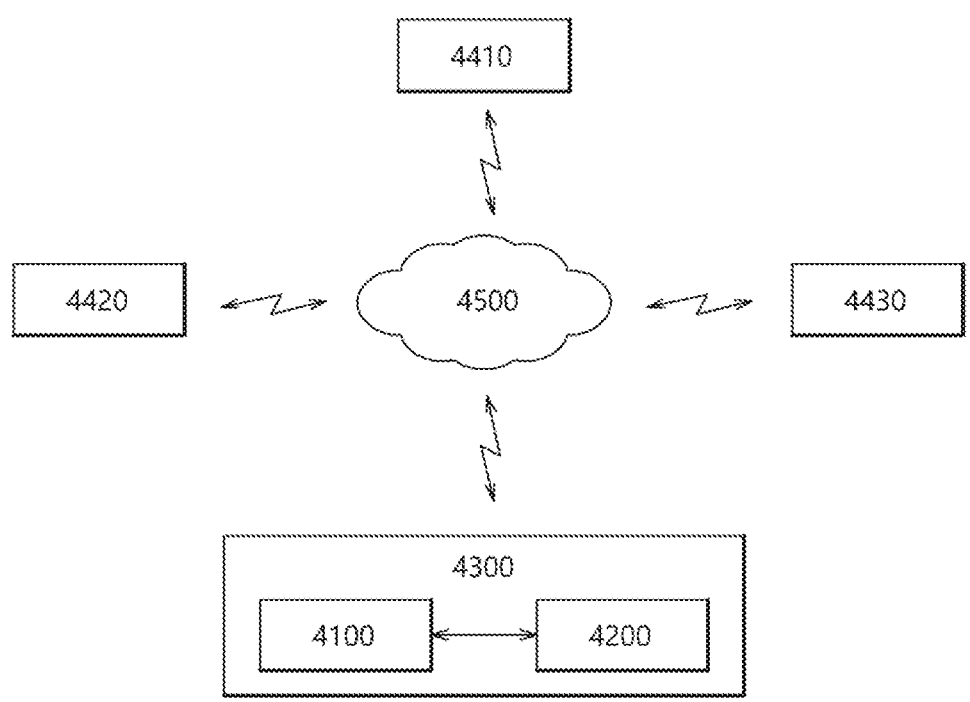
FIG. 13 is a simplified diagram illustrating a network system including a memory system in accordance with an embodiment.

FIG. 13 is a simplified diagram illustrating a network system 4000 including a memory system 4200 in accordance with an embodiment. Referring to FIG. 13, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the memory system 4200. The memory system 4200 may be configured by the memory system 100 shown in FIG. 1, the memory system 1200 shown in FIG. 10, the memory system 2200 shown in FIG. 11 or the memory system 3200 shown in FIG. 12.

Figure 14:
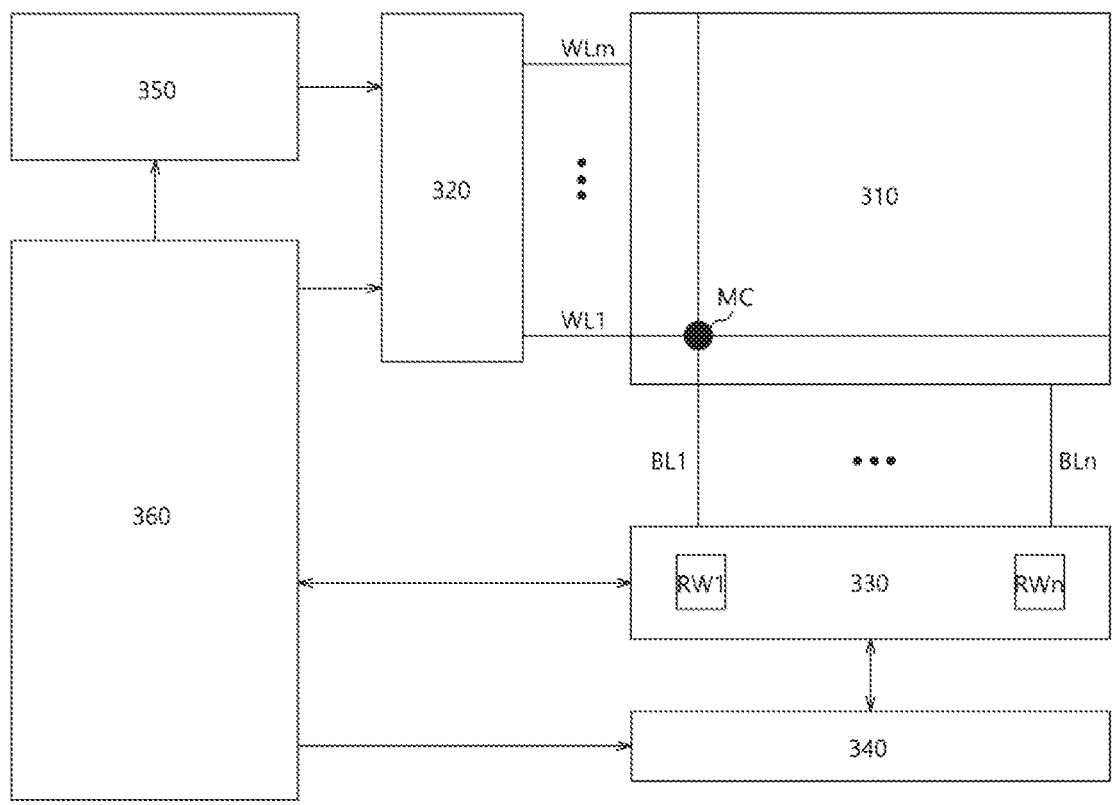
FIG. 14 is a block diagram illustrating a nonvolatile memory device included in a memory system in accordance with an embodiment.

FIG. 14 is a block diagram illustrating a nonvolatile memory device 300 included in a memory system in accordance with an embodiment. Referring to FIG. 14, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control an operation of the nonvolatile memory device 300, based on control signals provided from the external device. For example, the control logic 360 may control operations of the nonvolatile memory device 300 such as read, write and erase operations of the nonvolatile memory device 300.

While various embodiments have been described above, it will be understood to those skilled in the art that the embodiments described are examples only. Accordingly, the memory system and the operating method thereof described herein should not be limited based on the described embodiments.

What is claimed is:

1. A method for operating a memory system, comprising:
   checking, by a memory device manager, an available capacity of a memory device in response to a write request transmitted from a host device;
   determining, by the memory device manager, a parallel access size based on the available capacity;
   comparing, by the memory device manager, a size of host data to be written in one or more nonvolatile memory devices in response to the write request, with the available capacity;
   receiving, by the memory device manager, host data of a first size in the memory device from the host device; and
   writing, by an access unit, the host data received in the memory device, to the nonvolatile memory devices by a unit of the parallel access size.

2. The method according to claim 1, wherein the determining of the parallel access size comprises:
   determining, when the available capacity is equal to or larger than a maximum parallel access size, the maximum parallel access size as the parallel access size; and
   determining, when the available capacity is smaller than the maximum parallel access size, the parallel access size to be equal to or smaller than the available capacity.

3. The method according to claim 2, wherein the maximum parallel access size corresponds to a maximum number of nonvolatile memory devices that is accessed in parallel.

4. The method according to claim 1, wherein the receiving of the host data in the memory device comprises:
   receiving all the host data in the memory device when the size of the host data is equal to or smaller than the available capacity; and
   receiving host data having a total size that is equal to the parallel access size in the memory device when the size of the host data exceeds the available capacity.

5. The method according to claim 1, wherein, when the first size is larger than the parallel access size, the writing of the host data received in the memory device to the nonvolatile memory devices comprises:
   dividing the host data received in the memory device, by the unit of the parallel access size; and
   sequentially writing the divided host data in nonvolatile memory devices, corresponding to the parallel access size.

6. The method according to claim 1, wherein, when the first size is smaller than the parallel access size, the writing of the host data received in the memory device to the nonvolatile memory devices comprises:
   generating merged data of the parallel access size by merging the host data received in the memory device with another data; and
   writing the merged data in nonvolatile memory devices corresponding to the parallel access size.

7. The method according to claim 1, further comprising, after the writing of the host data received in the memory device to the nonvolatile memory devices:
   comparing, by the memory device manager, when there remains host data to be provided, a size of the remaining host data with the available capacity;
   receiving subsequent host data of a second size in the memory device from the host device, by the memory device manager; and
   writing, by the access unit, the subsequent host data received in the memory device, to the nonvolatile memory devices by parallel access size.

8. The method according to claim 1, further comprising, after the writing of the host data received in the memory device to the nonvolatile memory devices:
   checking, when there remains host data to be provided, a currently available capacity of the memory device, by the memory device manager;
   determining, by the memory device manager, a new parallel access size based on the currently available capacity;
   comparing, by the memory device manager, a size of the remaining host data with the currently available capacity;
   receiving subsequent host data of a second size in the memory device from the host device, by the memory device manager; and
   writing, by the access unit, the subsequent host data received in the memory device, to the nonvolatile memory devices by a unit of the new parallel access size.

9. The method according to claim 1, further comprising returning after the writing of the host data received in the memory device to the nonvolatile memory devices, a memory region occupied temporarily storing the host data in the memory device, by the memory device manager.

10. The method according to claim 1, wherein the writing of the host data received in the memory device to the nonvolatile memory devices comprises accessing in parallel one or more nonvolatile memory devices corresponding to the parallel access size.

11. A memory system comprising:
one or more nonvolatile memory devices; and
a controller including a memory device which temporarily stores data transmitted from a host device, wherein the controller comprises: a memory device manager configured to:
check an available capacity of the memory device in response to a write request transmitted from the host device;
determine a parallel access size based on the available capacity;
compare a size of host data to be written in the one or more of the nonvolatile memory devices in response to the write request with the available capacity; and
receive host data having a first size in the memory device from the host device; and
an access unit configured to write the host data received in the memory device to the nonvolatile memory devices by a unit of the parallel access size.

12. The memory system according to claim 11,
wherein, when the available capacity is equal to or larger than a maximum parallel access size, the memory device manager determines the maximum parallel access size as the parallel access size, and
wherein, when the available capacity is smaller than the maximum parallel access size, the memory device manager determines the parallel access size to be equal to or smaller than the available capacity.

13. The memory system according to claim 12, wherein the maximum parallel access size corresponds to a maximum number of nonvolatile memory devices that can be accessed in parallel.

14. The memory system according to claim 11, wherein the memory device manager receives all the host data in the memory device when the size of the host data is equal to or smaller than the available capacity, and receives host data having the parallel access size in the memory device when the size of the host data exceeds the available capacity.

15. The memory system according to claim 11, wherein, when the first size is larger than the parallel access size, the access unit divides the host data received in the memory device in the first data segments each having a size equal to the parallel access size, and sequentially writes the divided host data in nonvolatile memory devices corresponding to the parallel access size.

16. The memory system according to claim 11, wherein, when the first size is smaller than the parallel access size, the access unit generates merged data of the parallel access size by merging the host data received in the memory device with another data, and writes the merged data in nonvolatile memory devices corresponding to the parallel access size.

17. The memory system according to claim 11,
wherein the memory device manager further compares, when there remains host data to be provided, a size of the remaining host data with the available capacity, and receives subsequent host data of a second size in the memory device from the host device, and
wherein the access unit further writes, when there remains host data to be provided, the subsequent host data received in the memory device, to the nonvolatile memory devices by the unit of the parallel access size.

18. The memory system according to claim 11,
wherein the memory device manager further checks, when there remains host data to be provided, a currently available capacity of the memory device, determines a new parallel access size based on the currently available capacity, compares a size of the remaining host data with the currently available capacity, and receives subsequent host data of a second size in the memory device from the host device, and
wherein the access unit further writes, when there remains host data to be provided, the subsequent host data received in the memory device, to the nonvolatile memory devices by a unit of the new parallel access size.

19. The memory system according to claim 11, wherein the memory device manager further returns a memory region occupied temporarily storing the host data in the memory device.

20. A memory system comprising:
one or more nonvolatile memory apparatuses;
a memory device; and
a controller configured to perform steps of:
determining a parallel access size up to a smaller one between a currently available capacity of the memory device and a maximum parallel access size;
controlling the memory device to buffer at least a part of write data as much as the available capacity to the maximum;
controlling the nonvolatile memory apparatuses to store in parallel the buffered write data in data segments each having a size equal to the determined parallel access size;
clearing the buffered write data from the memory device; and
repeating the determining and the controlling until the nonvolatile memory apparatuses store the write data.

* * * * *